(12) United States Patent
Chen

(10) Patent No.: US 6,860,183 B1
(45) Date of Patent: Mar. 1, 2005

(54) CIRCULAR SAW HAVING SAW ARM ANGLE ADJUSTING DEVICE

(75) Inventor: Ruey Zou Chen, Dali (TW)

(73) Assignee: Rexon Co., Ltd., Taichung Hsien (TW)

( * ) Notice: Subject to any disclaimer, the term of this patent is extended or adjusted under 35 U.S.C. 154(b) by 97 days.

(21) Appl. No.: 10/419,832

(22) Filed: Apr. 22, 2003

(51) Int. Cl.[7] .............................................. B23D 45/04
(52) U.S. Cl. ........................... 83/471.3; 83/473; 83/490
(58) Field of Search ............................... 83/471.3, 473, 83/477, 477.1, 490, 581

(56) References Cited

U.S. PATENT DOCUMENTS 2,844,173 A * 7/1958 Gaskell ...................... 83/477.1
6,779,428 B2 * 9/2002 Kao ........................... 83/471.3
6,662,697 B1 * 12/2003 Chen .......................... 83/471.3
2003/0024365 A1 * 2/2003 Chang ........................ 83/471.3

* cited by examiner

Primary Examiner—Stephen Choi
(74) Attorney, Agent, or Firm—Rosenberg, Klein & Lee

(57) ABSTRACT

A circular saw includes a base, a saw arm, and an angle adjusting device. The angle adjusting device includes a rod unit, a first gear unit, a second gear unit, and a positioning unit. The rod unit includes an outer rod, and an inner rod. The first gear unit includes a first drive gear and a first driven gear. The second gear unit includes a second drive gear and a second driven gear. The positioning unit includes a mounting tube, and a positioning bolt. Thus, the inclined angle of the saw arm can be adjusted by the angle adjusting device easily and conveniently, thereby facilitating the user operating the circular saw.

12 Claims, 5 Drawing Sheets

CIRCULAR SAW HAVING SAW ARM ANGLE ADJUSTING DEVICE

BACKGROUND OF THE INVENTION

1. Field of the Invention

The present invention relates to a circular saw having a saw arm angle adjusting device, and more particularly to a circular saw having a saw arm angle adjusting device that can facilitate the user's operation.

2. Description of the Related Art

A conventional circular saw in accordance with the prior art comprises a base, a saw arm mounted on the base, and a saw blade mounted on the saw arm. The saw arm may be moved toward the base for cutting the workpiece on the base by the rotating the saw blade. The conventional circular saw also comprises an adjusting device for adjusting the angle of the saw arm relative to the base, so that the saw arm is inclined with the base. Thus, the cutting face of the workpiece may be cut to have an inclined shape. The adjusting device is usually mounted on the rear portion of the saw arm, so that the user has to move to the rear portion of the saw arm, so as to operate the adjusting device, thereby causing inconvenience to the user. In addition, the adjusting device only provides a larger angle adjusting function, and cannot be used to micro-adjust the angle of the saw arm relative to the base.

SUMMARY OF THE INVENTION

The present invention is to mitigate and/or obviate the disadvantage of the conventional angle adjusting device of the circular saw.

The primary objective of the present invention is to provide a circular saw having a saw arm angle adjusting device that can facilitate the user's operation.

Another objective of the present invention is to provide a circular saw having a saw arm angle adjusting device, wherein the inclined angle of the saw arm can be adjusted and positioned easily and conveniently before operation of the circular saw, thereby facilitating the user operating the circular saw.

A further objective of the present invention is to provide a circular saw having a saw arm angle adjusting device, wherein the mounting tube is combined with the positioning bolt, thereby saving time of assembly.

A further objective of the present invention is to provide a circular saw having a saw arm angle adjusting device, wherein the first end of the positioning bolt is combined with the second end of the mounting tube and the locking nut is screwed on the second end of the positioning bolt for positioning the positioning bolt, thereby preventing detachment of the positioning bolt due to excessive rotation.

In accordance with the present invention, there is provided a circular saw, comprising a base, a saw arm, and an angle adjusting device for adjusting an inclined angle of the saw arm, wherein:

the base a side provided with a rotor;

the saw arm is mounted on the rotor of the base;

the angle adjusting device is mounted on the base and includes a rod unit, a first gear unit, a second gear unit, and a positioning unit, wherein:

the rod unit includes an outer rod, and an inner rod mounted in the outer rod;

the first gear unit includes a first drive gear secured on the outer rod, and a first driven gear meshing with the first drive gear;

the second gear unit includes a second drive gear rotated by a driving force supplied by the first driven gear of the first gear unit, and a second driven gear secured on the rotor for rotating the rotor and meshing with the second drive gear; and the positioning unit includes a mounting tube, and a positioning bolt, the mounting tube has a first end secured on the inner rod, the positioning bolt has a first end locked on a second end of the mounting tube and a second end protruded outward from the rotor, and the positioning unit further includes a locking nut screwed on the second end of the positioning bolt.

Further benefits and advantages of the present invention will become apparent after a careful reading of the detailed description with appropriate reference to the accompanying drawings.

DETAILED DESCRIPTION OF THE INVENTION

Figure 1:
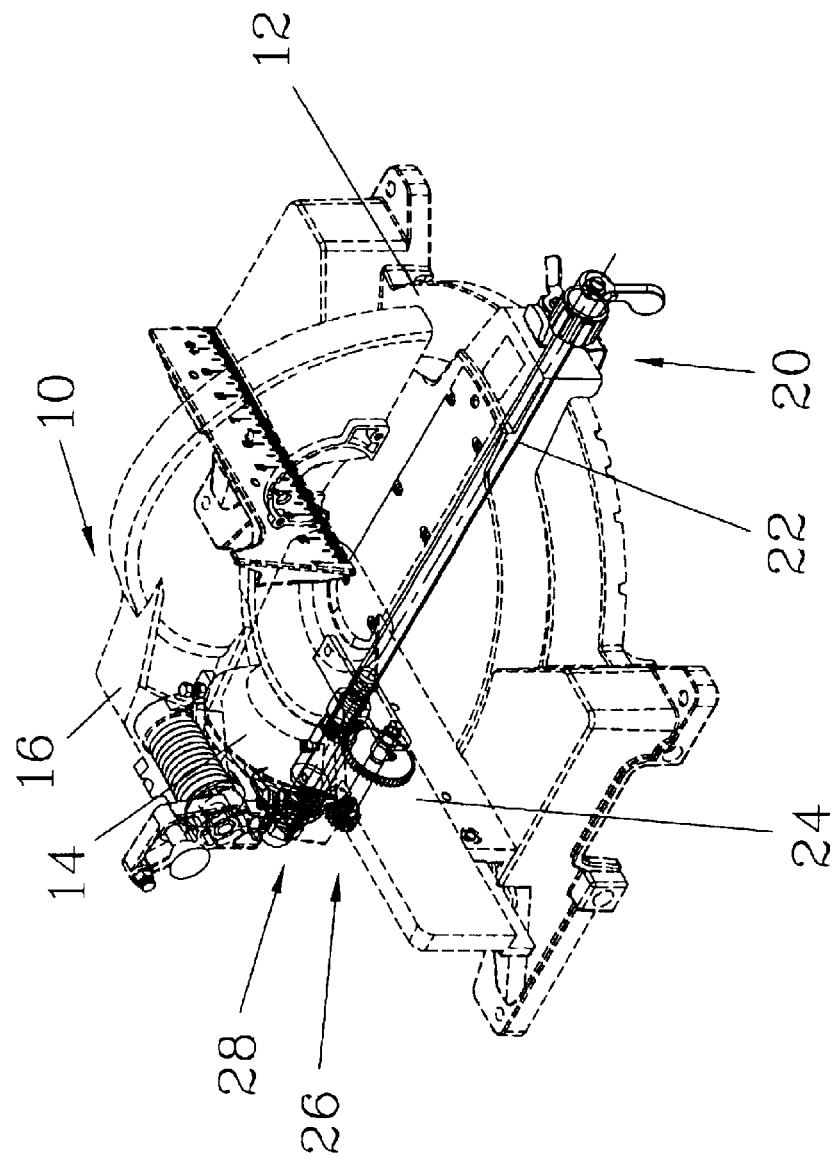
FIG. 1 is a perspective view of a circular saw having a saw arm angle adjusting device in accordance with the preferred embodiment of the present invention.

Referring to the drawings and initially to FIG. 1, a circular saw 10 having a saw arm angle adjusting device in accordance with the preferred embodiment of the present invention comprises a base 12, a saw arm 16, and an angle adjusting device 20 for adjusting the inclined angle of the saw arm 16.

The base 12 is a circular body having a side provided with a rotor 14.

The saw arm 16 has a first end pivotally mounted on the rotor 14 of the base 12 and a second end provided with a saw blade (not shown). Thus, the saw arm 16 can be pivoted relative to the base 12 in a vertical manner, and can be rotated with the rotor 14 to deflect in an inclined manner.

The angle adjusting device 20 is mounted on a bottom face of the base 12, and includes a rod unit 22, a first gear unit 24, a second gear unit 26, and a positioning unit 28.

Figure 2:
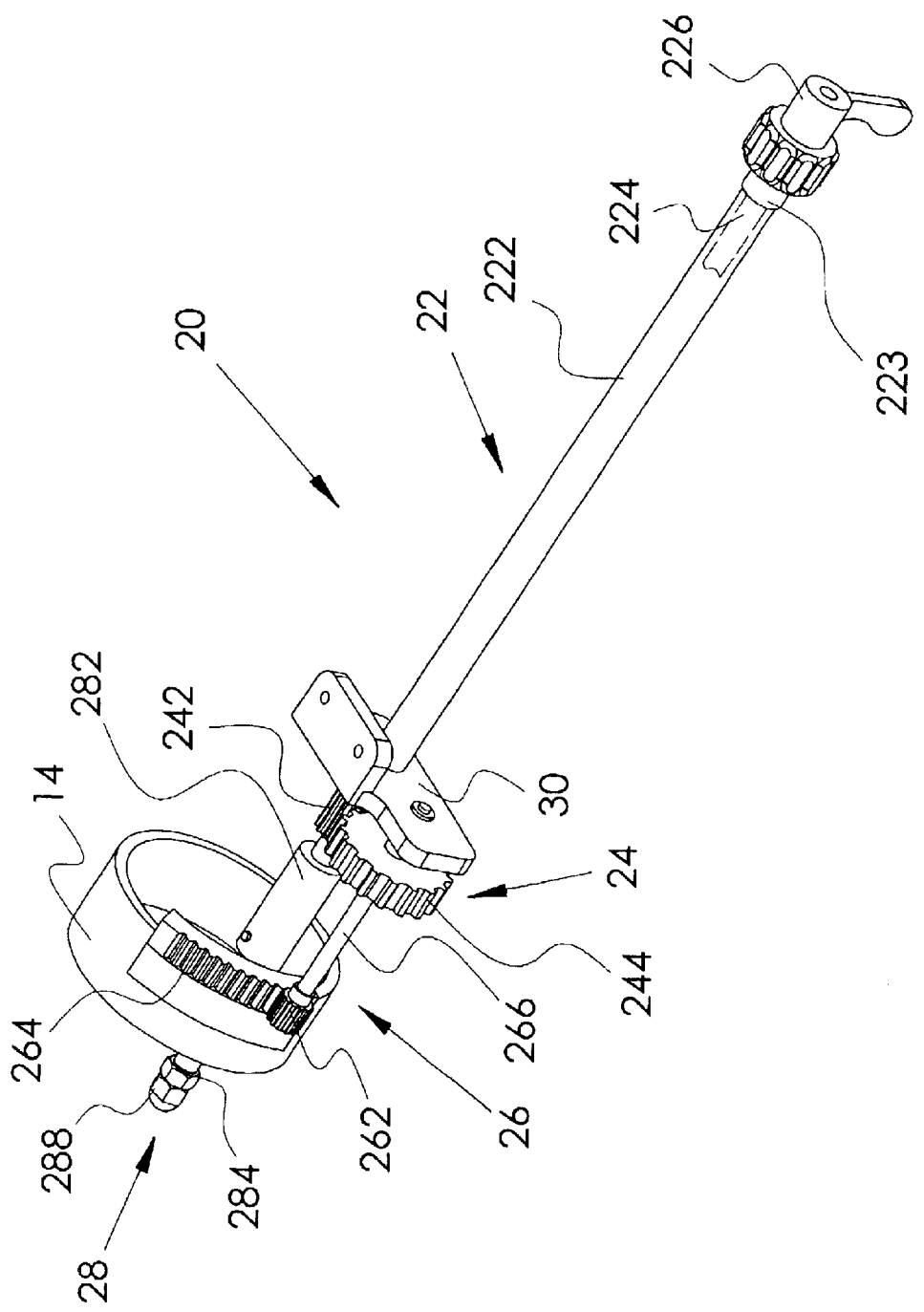
FIG. 2 is a perspective view of an angle adjusting device of the circular saw in accordance with the preferred embodiment of the present invention.
Figure 3:
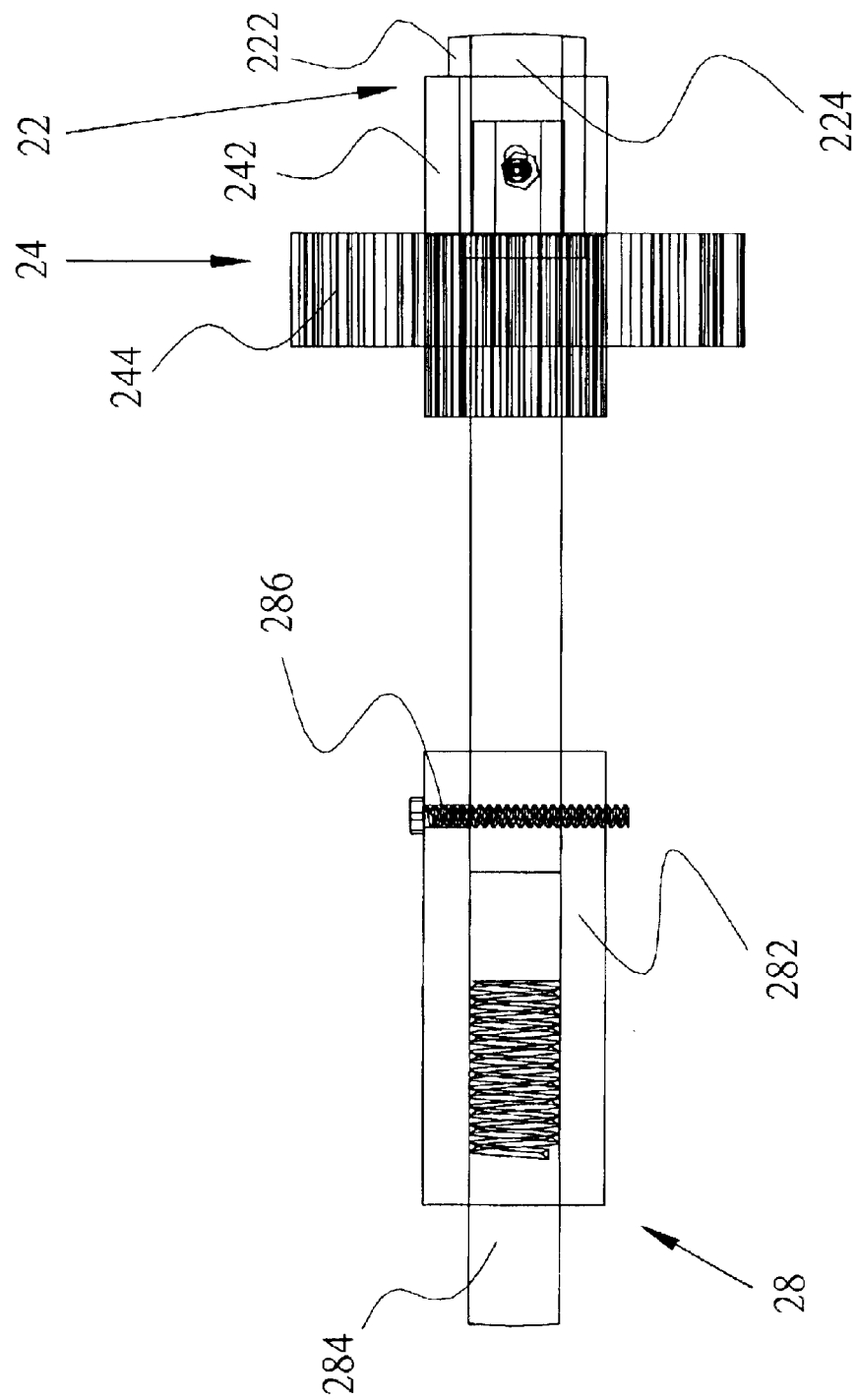
FIG. 3 is a schematic plan view of the angle adjusting device of the circular saw in accordance with the preferred embodiment of the present invention.
Figure 4A:
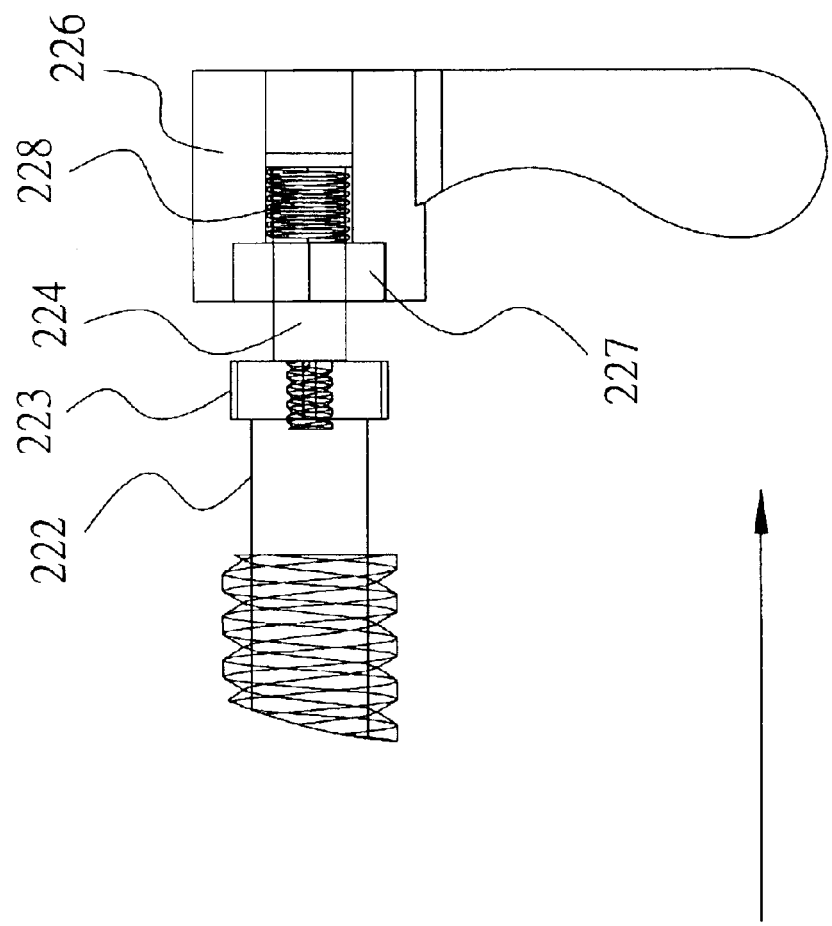
FIG. 4A is a schematic operational view of the angle adjusting device of the circular saw as shown in FIG. 4 in use.
Figure 4:
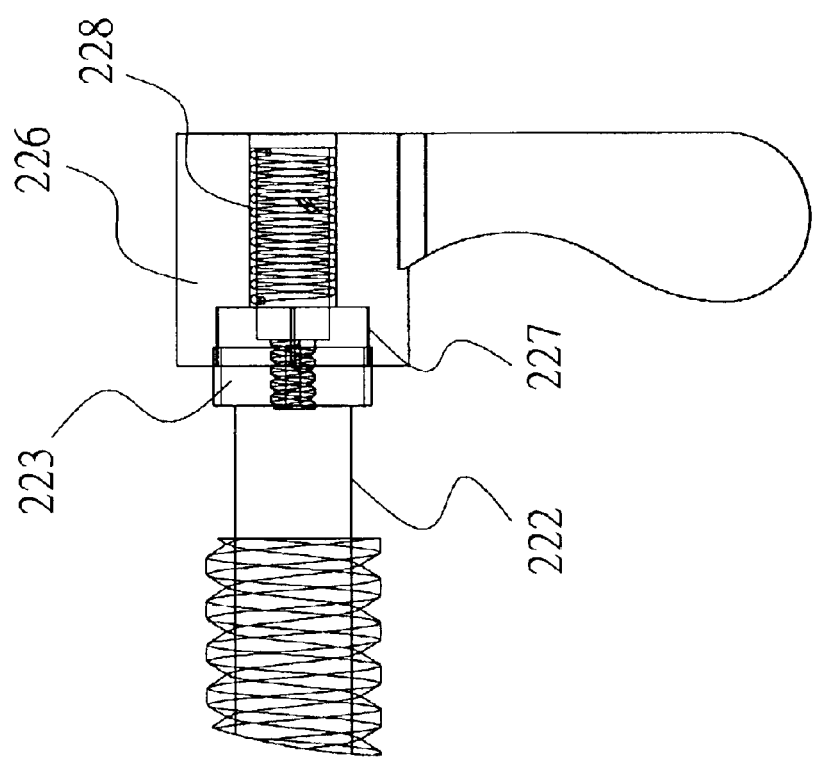
FIG. 4 is a partially cut-away schematic plan view of the angle adjusting device of the circular saw in accordance with the preferred embodiment of the present invention.

Referring to FIGS. 2–4, the rod unit 22 includes an outer rod 222, and an inner rod 224 mounted in the outer rod 222. The outer rod 222 has a first end provided with a locking block 223. The inner rod 224 has a first end provided with an operation handle 226. The operation handle 226 is formed with a locking cavity 227 for securing the locking block 223 of the outer rod 222. The rod unit 22 further includes a spring 228 mounted between the inner rod 224 and the operation handle 226, so that the operation handle 226 can be displaced movably. Thus, when the locking block 223 of the outer rod 222 is combined with the locking cavity 227 of the operation handle 226, rotation of the operation handle 226 can drive the outer rod 222 to rotate. Alternatively, the operation handle 226 can be pulled outward to detach the locking block 223 of the outer rod 222 from the locking cavity 227 of the operation handle 226, so that rotation of the operation handle 226 can drive the inner rod 224 to rotate independently.

Referring to FIGS. 2 and 3, the first gear unit 24 includes a first drive gear 242, and a first driven gear 244. The first drive gear 242 is secured on a second end of the outer rod 222. The first driven gear 244 is pivotally mounted on a fixing bracket 30, and meshes with the first drive gear 242.

The second gear unit 26 includes a second drive gear 262, and a second driven gear 264. The second drive gear 262 is connected to the first driven gear 244 of the first gear unit 24 by a shaft 266 which is fixed on the fixing bracket 30 and extended through the first gear unit 24. The second driven gear 264 is secured on the rotor 14 for rotating the rotor 14, and meshes with the second drive gear 262.

The positioning unit 28 includes a mounting tube 282, and a positioning bolt 284. The mounting tube 282 has a first end mounted on a second end of the inner rod 224. Preferably, the first end of the mounting tube 282 is secured on the second end of the inner rod 224 by a positioning member 286. The positioning bolt 284 has a first end locked on a second end of the mounting tube 282 and a second end protruded outward from the rotor 14. The positioning unit 28 further includes a locking nut 288 screwed on the second end of the positioning bolt 284. Thus, the positioning bolt 284 is urged on the rotor 14 without detachment.

Referring to FIGS. 2–4, the operation handle 226 can be pulled outward to detach the locking block 223 of the outer rod 222 from the locking cavity 227 of the operation handle 226 as shown in FIG. 4A, so that rotation of the operation handle 226 can drive the inner rod 224 to rotate independently so as to rotate the mounting tube 282. Then, by transmission of the mounting tube 282, the urging state between the positioning bolt 284 and the rotor 14 is released.

Figure 5:
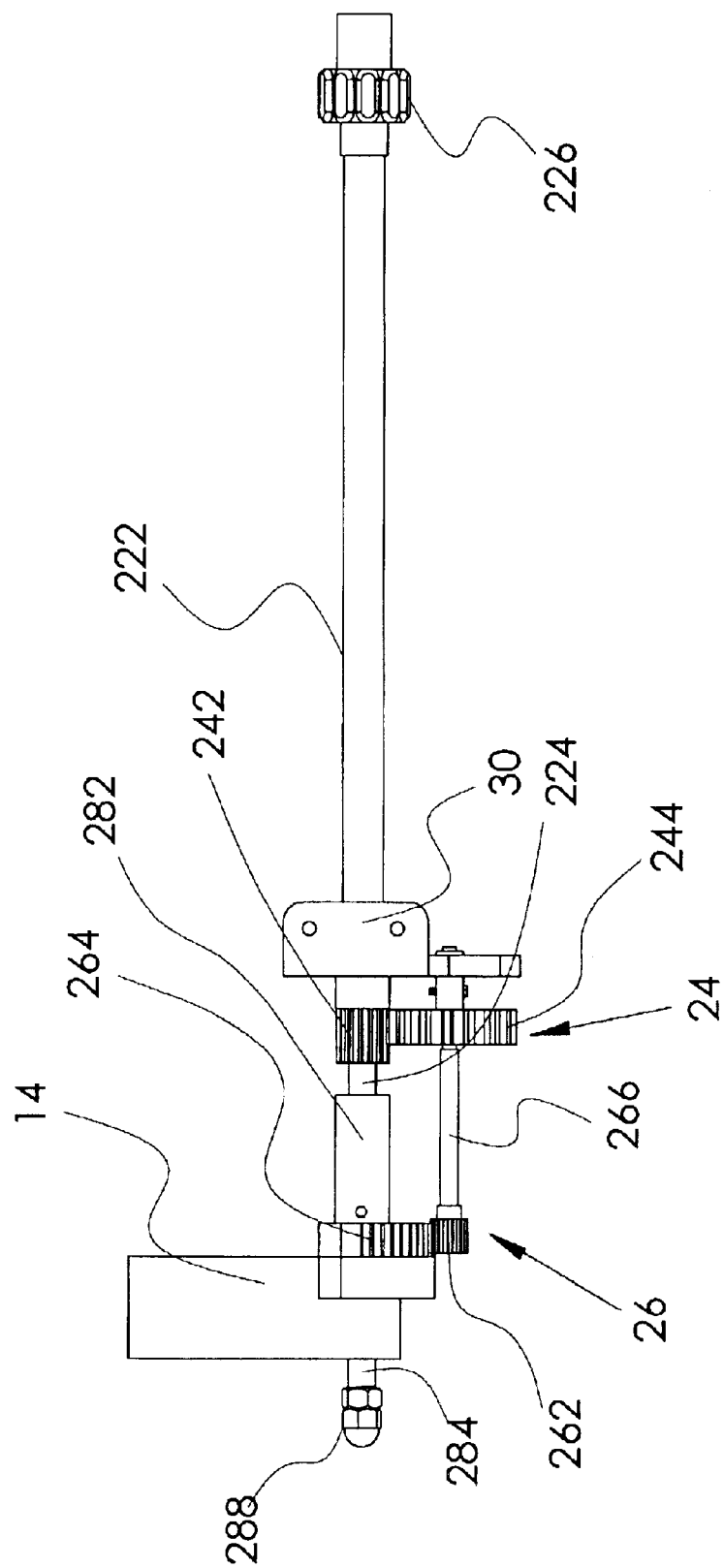
FIG. 5 is a schematic plan view of the angle adjusting device of the circular saw in accordance with the preferred embodiment of the present invention.

Referring to FIGS. 4 and 5, the locking block 223 of the outer rod 222 is inserted into and locked in the locking cavity 227 of the operation handle 226 as shown in FIG. 4, so that the outer rod 222 is combined with the operation handle 226. Thus, rotation of the operation handle 226 can drive and rotate the outer rod 222 which rotates the first drive gear 242 which rotates the first driven gear 244 which rotates the second drive gear 262 which rotates the second driven gear 264 which rotates the rotor 14 simultaneously.

As shown in FIG. 1, the saw arm 16 is mounted on the rotor 14 of the 11 base 12, so that rotation of the rotor 14 of the base 12 drives the saw arm 16 to deflect in an inclined manner. Then, in a similar manner, the operation handle 226 can be pulled outward to detach the locking block 223 of the outer rod 222 from the locking cavity 227 of the operation handle 226 as shown in FIG. 4A, so that rotation of the operation handle 226 can drive the inner rod 224 to rotate independently so as to rotate the mounting tube 282. Then, by transmission of the mounting tube 282, the positioning bolt 284 is again urged on the rotor 14, so as to position the rotor 14, thereby positioning the saw arm 16 rigidly and stably. In such a manner, adjustment of the inclined angle of the saw arm 16 is accomplished.

Accordingly, the inclined angle of the saw arm 16 can be adjusted and positioned by the angle adjusting device 20 easily and conveniently before operation of the circular saw 10, thereby facilitating the user operating the circular saw 10. In addition, the mounting tube 282 is combined with the positioning bolt 284, thereby saving time of assembly. Further, the first end of the positioning bolt 284 is combined with the second end of the mounting tube 282 and the locking nut 288 is screwed on the second end of the positioning bolt 284 for positioning the positioning bolt 284, thereby preventing detachment of the positioning bolt 284 due to excessive rotation.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A circular saw comprising a base, a saw arm, and an angle adjusting device for adjusting an inclined angle of the saw arm, wherein:

the base having a side provided with a rotor;

the saw arm is mounted on the rotor of the base;

the angle adjusting device is mounted on the base and includes a rod unit, a first gear unit, a second gear unit, and a positioning unit, wherein:

the rod unit includes an outer rod, and an inner rod mounted in the outer rod;

the first gear unit includes a first drive gear secured on the outer rod, and a first driven gear meshing with the first drive gear;

the second gear unit includes a second drive gear rotated by a driving force supplied by the first driven gear of the first gear unit, and a second driven gear secured on the rotor for rotating the rotor and meshing with the second drive gear; and the positioning unit includes a mounting tube, and a positioning bolt, the mounting tube has a first end secured on the inner rod, the positioning bolt has a first end locked on a second end of the mounting tube and a second end protruded outward from the rotor, and the positioning unit further includes a locking nut screwed on the second end of the positioning bolt.

2. The circular saw in accordance with claim 1, wherein the angle adjusting device is mounted on a bottom face of the base.

3. The circular saw in accordance with claim 1, wherein the outer rod has a first end provided with a locking block, the inner rod has a first end provided with an operation handle, and the operation handle is formed with a locking cavity for securing the locking block of the outer rod.

4. The circular saw in accordance with claim 3, wherein the rod unit further includes a spring mounted between the inner rod and the operation handle.

5. The circular saw in accordance with claim 3, wherein when the locking block of the outer rod is combined with the locking cavity of the operation handle, rotation of the operation handle drives the outer rod to rotate.

6. The circular saw in accordance with claim 3, wherein the operation handle can be pulled outward to detach the locking block of the outer rod from the locking cavity of the operation handle, so that rotation of the operation handle can drive the inner rod to rotate independently.

7. The circular saw in accordance with claim 3, wherein the first drive gear is secured on a second end of the outer rod.

8. The circular saw in accordance with claim 3, wherein the first end of the mounting tube is mounted on a second end of the inner rod.

9. The circular saw in accordance with claim 8, wherein the first end of the mounting tube is secured on the second end of the inner rod by a positioning member.

10. The circular saw in accordance with claim 1, wherein the first driven gear is pivotally mounted on a fixing bracket.

11. The circular saw in accordance with claim 10, wherein the second drive gear is connected to the first driven gear of the first gear unit by a shaft which is fixed on the fixing bracket and extended through the first gear unit.

12. The circular saw in accordance with claim 1, wherein the positioning bolt is urged on the rotor.

* * * * *